US007424134B2

(12) United States Patent
Chou

(10) Patent No.: US 7,424,134 B2
(45) Date of Patent: Sep. 9, 2008

(54) CARD-TYPE BIOMETRIC IDENTIFICATION DEVICE AND METHOD THEREFOR

(75) Inventor: Bruce C. S. Chou, Hsin Chu (TW)

(73) Assignee: LighTuning Tech. Inc., Hsinchu (TW)

( * ) Notice: Subject to any disclaimer, the term of this patent is extended or adjusted under 35 U.S.C. 154(b) by 643 days.

(21) Appl. No.: 10/793,929

(22) Filed: Mar. 8, 2004

(65) Prior Publication Data

US 2004/0179718 A1 Sep. 16, 2004

(30) Foreign Application Priority Data

Mar. 14, 2003 (TW) .............................. 92105599 A

(51) Int. Cl.
*G06K 9/00* (2006.01)
*G05B 19/00* (2006.01)

(52) U.S. Cl. .......................... 382/115; 340/5.82; 902/3; 902/5

(58) Field of Classification Search ................. 382/115, 382/124; 713/184
See application file for complete search history.

(56) References Cited

U.S. PATENT DOCUMENTS

| | | | | |
|---|---|---|---|---|
| 4,582,985 | A | 4/1986 | Löfberg | |
| 4,720,860 | A | 1/1988 | Weiss | |
| 5,180,901 | A | 1/1993 | Hiramatsu | |
| 5,280,527 | A | 1/1994 | Gullman et al. | |
| 5,450,491 | A * | 9/1995 | McNair | 713/184 |
| 5,623,552 | A | 4/1997 | Lane | |
| 6,202,927 | B1 * | 3/2001 | Bashan et al. | 235/451 |
| 6,325,285 | B1 * | 12/2001 | Baratelli | 235/380 |
| 6,371,378 | B1 * | 4/2002 | Brunet et al. | 235/492 |
| 6,439,464 | B1 * | 8/2002 | Fruhauf et al. | 235/492 |
| 6,547,130 | B1 | 4/2003 | Shen | |
| 6,942,147 | B2 * | 9/2005 | Lahteenmaki et al. | 235/441 |
| 7,178,025 | B2 * | 2/2007 | Scheidt et al. | 713/168 |
| 7,278,026 | B2 * | 10/2007 | McGowan | 713/186 |
| 2002/0140542 | A1 * | 10/2002 | Prokoski et al. | 340/5.52 |
| 2003/0024994 | A1 * | 2/2003 | Ladyansky | 235/492 |

FOREIGN PATENT DOCUMENTS

| | | | |
|---|---|---|---|
| CN | 1290380 | A | 4/2001 |
| DE | 196 31 569 | A1 | 7/1996 |
| DE | 196 48 767 | A1 | 11/1996 |
| TW | 356542 | | 5/1997 |
| WO | WO 03/027948 | A1 | 3/2002 |
| WO | WO-02/48485 | A1 | 6/2002 |

* cited by examiner

*Primary Examiner*—Charles Kim
(74) *Attorney, Agent, or Firm*—Muncy, Geissler, Olds & Lowe, PLLC

(57) ABSTRACT

A card-type biometric identification device includes a biometric sensor, an operating/processing module, a remote transceiver, and a rechargeable battery. The biometric sensor reads the biometric data of a holder. The operating/processing module stores a pseudorandom-code generating program, personal data, and authorized biometric data of the holder, and may then receive and process to-be-identified biometric data. After judging that the to-be-identified biometric data substantially matches with the authorized biometric data, the module generates and outputs a to-be-identified code by the pseudorandom-code generating program. The remote transceiver outputs the personal data to a host system to enable the host system to generate an authorized code by the pseudorandom-code generating program, which is stored in the host system and corresponds to the personal data. Comparing the authorized code with the to-be-identified code may judge whether or not the to-be-identified holder is an authorized holder.

23 Claims, 2 Drawing Sheets

CARD-TYPE BIOMETRIC IDENTIFICATION DEVICE AND METHOD THEREFOR

This Nonprovisional application claims priority under 35 U.S.C. §119(a) on Patent Application No(s). 092105599 filed in TAIWAN on Mar. 14, 2003, the entire contents of which are hereby incorporated by reference.

BACKGROUND OF THE INVENTION

1. Field of the Invention

The invention relates to a card-type biometric identification device and a method therefor, and more particularly to a biometric identification card embedded with a chip-type fingerprint sensor to provide the real-time identification for the card holder, wherein the biometric identification card may replace the credit card, the personal identification card, the driver's license, the passport, the social welfare card, the health insurance card, and the like.

2. Description of the Related Art

The banks and government have to spend a lot of labors and money to prevent the serious criminal acts such as unauthorized transactions of the credit cards, the uses of fake identification cards, and the uses of fake passports. However, the conventional method for implementing the data confidentiality using, for example, the personal identification number (Personal PIN) and the password tends to be easily unauthorized used. Consequently, the method utilizing the personal biometric characteristic as the key has become a most economic and practical method. More particularly, because of the convenience and the long-term stability of the minutia point of the fingerprint, using a fingerprint-based biometric identification card to replace the conventional credit card, personal identification card, passport, health insurance card, and the like, has become an important goal of the technology development.

Löfberg discloses a data carrier using the above-mentioned concept in U.S. Pat. No. 4,582,985. The device has a dimension like the commonly-used credit card, and the device mainly includes a fingerprint sensor and a signal reading and comparison circuit. The identity of the card holder may be judged by comparing the read fingerprint data from the fingerprint sensor and the previously stored fingerprint data. However, the device can only provide an indicator (e.g., LED) to identify whether or not the card holder is the authorized card holder, which means that the unauthorized transaction may be made as long as the indicator on a fake card is driven and controlled.

Gullman et al. disclose another method in U.S. Pat. No. 5,280,527, in which a time-varying pseudorandom-code generating program is provided in addition to the original biometric identification. The pseudorandom-code generating program generates a set of digits representing the personal identification according to the identified fingerprint data. Finally, the host system executes the decoding and/or decryption process according to the digits and thus generates a set of fixed code and a correction factor for identification. The '527 patent may solve the drawback of '985 patent. In the method of the '527 patent, however, complicated decryption and/or decoding operations have to be performed in the host system. Thus, the loading of the host system is increased, and the processing speed of the host system is also decreased. Meanwhile, the procedures for personal identification are performed by the operator who has to record the displayed digits on the card and then input the digits to the terminal system, and mistakes tend to occur in the procedures. In addition, in the overall procedures, there is no interaction, such as how to inform the terminal system the personal identification data (I.D. data), between the identification device and the terminal system.

Lane discloses still another method in U.S. Pat. No. 5,623,552, wherein a magnetic stripe serves as the device for communicating with the host system in order to effectively overcome the drawback of the '527 patent. However, the data recorded in the magnetic stripe is fixed and the same as that of the currently used credit card with the magnetic stripe, which must be accessed in a card reader to transfer the card holder's information. This way may induce the most frequently happening problem that the personal data is easily intercepted.

In addition, the above-mentioned prior arts disclose no detail descriptions with respect to the used power. Even if the above-mentioned devices contain embedded power supplies, the fingerprint comparison needs relatively large power consumption (the current is greater than 100 mA), therefore without a new ultra-thin battery can not satisfy the card application for the long-term usage. For example, the credit card or identification card is usually reissued after several years.

SUMMARY OF THE INVENTION

It is therefore an object of the invention to provide a card-type biometric identification device having high security, long lifetime, and a standardized, human-oriented, and private communicate interface.

Another object of the invention is to introduce a standalone, non-contact biometric card device to solve the problem of easy interception of the personal data in the contact-type card configuration.

To achieve the above-mentioned object, the invention provides a card-type biometric identification device for identifying whether or not a to-be-identified holder beside a terminal system which is a host system or is connected to the host system is an authorized holder. The host system stores personal data of the authorized holder and a pseudorandom-code generating program corresponding to the personal data. The card-type biometric identification device includes a biometric sensor, an operating/processing module, a remote transceiver and a rechargeable battery. The biometric sensor reads and outputs authorized biometric data of the authorized holder and to-be-identified biometric data of the to-be-identified holder. The operating/processing module is for receiving, processing and storing the pseudorandom-code generating program, the personal data and the authorized biometric data only once, and then for receiving and processing the to-be-identified biometric data multiple times. The operating/processing module generates and outputs a to-be-identified code by the pseudorandom-code generating program after the to-be-identified biometric data is judged to substantially match with the authorized biometric data. The remote transceiver is for outputting the personal data to the host system to enable the host system to generate an authorized code according to the pseudorandom-code generating program corresponding to the personal data. It is judged whether or not the to-be-identified holder is the authorized holder by comparing the authorized code to the to-be-identified code. The rechargeable battery is for providing power for the operating/processing module, the biometric sensor and the remote transceiver.

The invention also provides a biometric identification method comprising the steps of: reading and outputting to-be-identified biometric data of a to-be-identified holder to an operating/processing module; processing, by the operating/processing module, the to-be-identified biometric data and judging, by the operating/processing module, whether or not the to-be-identified biometric data substantially matches with the authorized biometric data; generating, by the operating/processing module, to-be-identified code according to the pseudorandom-code generating program stored therein if the to-be-identified biometric data substantially matches with the authorized biometric data; and causing the operating/processing module to output the personal data to the host system to enable the host system to generate an authorized code according to the pseudorandom-code generating program corresponding to the personal data, wherein comparing the to-be-identified code to the authorized code may judge whether or not the to-be-identified holder is the authorized holder.

DETAILED DESCRIPTION OF THE INVENTION

Figure 1:
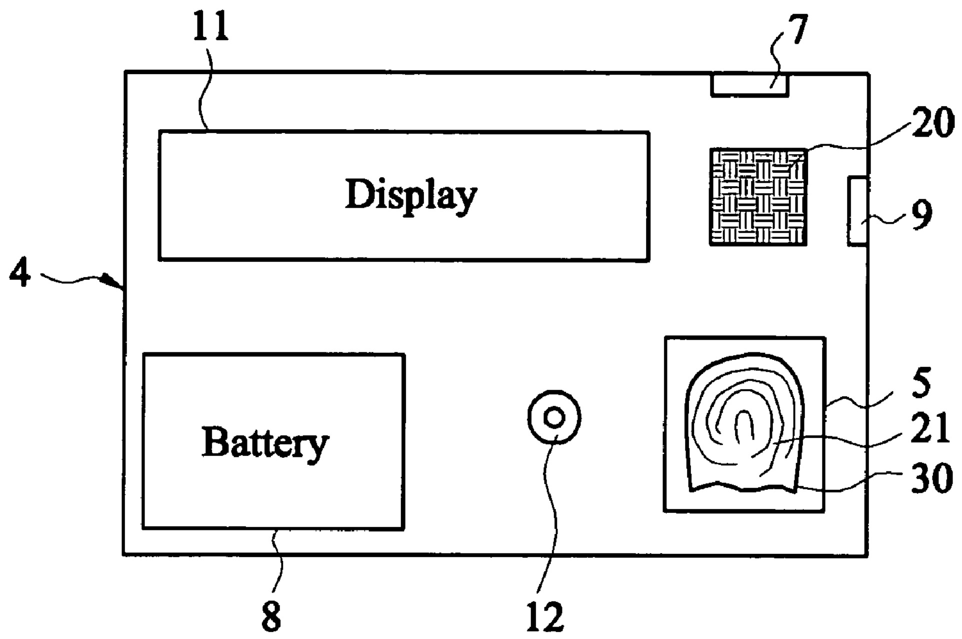
FIG. 1 is a schematic illustration showing a card-type biometric identification device according to a first embodiment of the invention.
Figure 2:
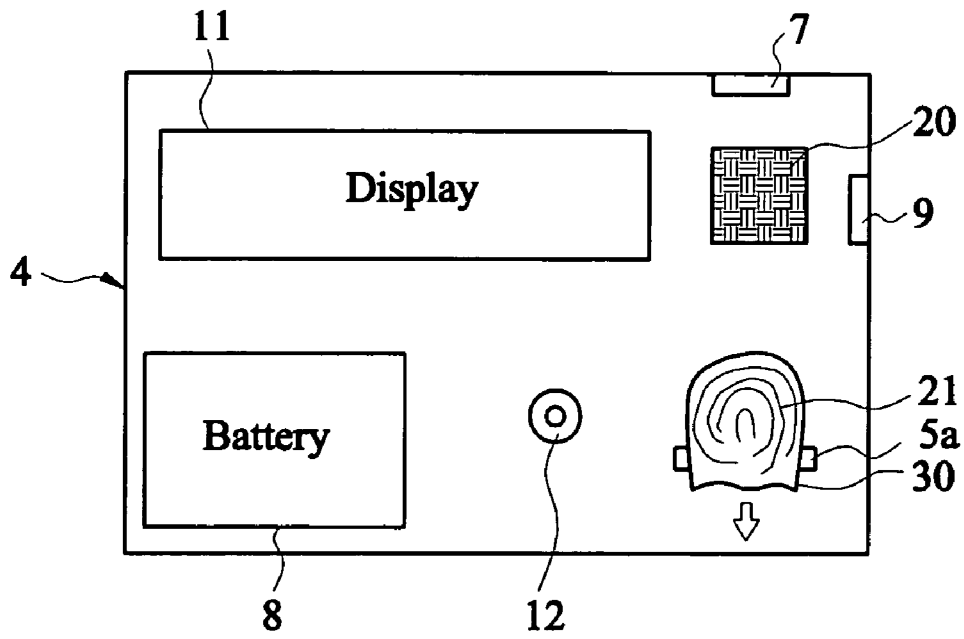
FIG. 2 is a schematic illustration showing a card-type biometric identification device according to a second embodiment of the invention.

FIGS. 1 and 2 are schematic illustrations showing card-type biometric identification devices (hereafter referred to as bio-cards) according to first and second embodiments of the invention, respectively. Referring to FIGS. 1 and 2, the bio-card 4 of the invention mainly includes a biometric sensor 5 or 5*a*, a remote transceiver 7, a rechargeable battery 8, a connector 9, a display 11, a power switch 12, and an anti-counterfeit mark 20, all of which may be seen from the outside of the device. The length and width of the bio-card 4 may be configured to be completely the same as the dimension (85 mm * 55 mm) of the typical credit card. In addition, the electrical components and display contained in the bio-card 4 may be assembled on a printed circuit board. In one embodiment, the thickness (about 2 to 3 mm) of the bio-card 4 may be configured to be thicker than the thickness (about 0.8 mm) of the typical credit card or smart card. If the thickness (about 0.8 mm) requirement of the smart card has to be satisfied, the associated electrical component chips have to be made thin, and it is preferred that a sweep-type fingerprint sensor, a flexible display and a COF (Chip On Film) package method are adopted. The polymeric lithium rechargeable battery adopted in the invention may be made into a product having the thickness smaller than 0.8 mm, and a high storage capacity capable of satisfying the device requirement of the invention. Thus, the device of the invention may be implemented without any problem.

Herein, the biometric sensor 5 is a chip-type fingerprint sensor, such as a capacitive fingerprint sensor, which may be a two-dimensional fingerprint sensor 5 (FIG. 1) or a sweep-type fingerprint sensor 5*a* (FIG. 2). In FIG. 1, the fingerprint reading may be implemented when a finger 30 contacts the fingerprint sensor 5; and in FIG. 2, the finger 30 has to contact the fingerprint sensor 5*a* and sweep in a direction as indicated by the arrow.

The fingerprint sensor 5 or 5*a* is for reading the fingerprint 21 of the finger 30, and the read fingerprint 21 is then compared to the fingerprint data that is stored in the bio-card 4 in advance. Because the bio-card 4 is an independent identification device, it includes microprocessors with very strong processing capabilities and associated memories (FIG. 3) to perform the fingerprint image processing, extraction of minutia points or minutia blocks, encryption, decryption, and comparison operations with respect to the read fingerprint 21. Alternatively, the biometric sensor 5 also may be the audio or voice sensor or the digital panel.

In this embodiment, the rechargeable battery 8 is a polymeric lithium battery, which can be recharged repeatedly and supply the current required by the whole bio-card 4. In addition, any type of rechargeable battery, such as the solid-state battery or ultra-capacitor, satisfying the dimension and power requirements can be adopted. In order to achieve the operation efficiency of the bio-card 4, the stable peak supplying current of the rechargeable battery 8 has to reach 100 to 150 mA, such that the processing and comparing operations may be finished within one second.

The bio-card 4 identifies the identity of the holder by collating the stored fingerprint with the read holder's fingerprint, and then the pseudorandom-code generating program, which is built in the device and may vary with time and usage times, generates a to-be-identified code, which may include pure digits for representing the personal identification. The pseudorandom-code generating program is disclosed in, for example, U.S. Pat. No. 4,720,860, and the disclosure of which is incorporated herein by reference. In another embodiment, after the verification of the card holder by the fingerprint matching, the communication method may follow the smart card standard using a private key (stored in the card) and a public key (stored in the host system) and related encryption and decryption methods. The smart card standard is a well known technology, and detailed description thereof is omitted.

The host system also has stored the pseudorandom-code generating program for generating an authorized code. The to-be-identified code may be transferred to the host system via the remote transceiver 7, and then the host system may check the correctness of the to-be-identified code. The display 11 may be a reflective liquid crystal display for mainly displaying the information during the operation procedure of the holder and displaying the to-be-identified code, such that the holder or operator may double check the identity correctness of the to-be-identified code according to the authorized code.

In order to save the power, the bio-card 4 mainly controls the power supply by the power switch 12. Furthermore, in order to identify the truth of the bio-card 4 from the issue company or organization or government, the anti-counterfeit mark 20, such as a hologram security label, may be formed on its external surface. The pseudorandom-code generating program of the bio-card 4 may be inputted (only once) by the card issuer or the government issuer through the micro connector 9 (e.g., RS232 or USB connector), through which the rechargeable battery 8 may also be recharged.

Figure 3:
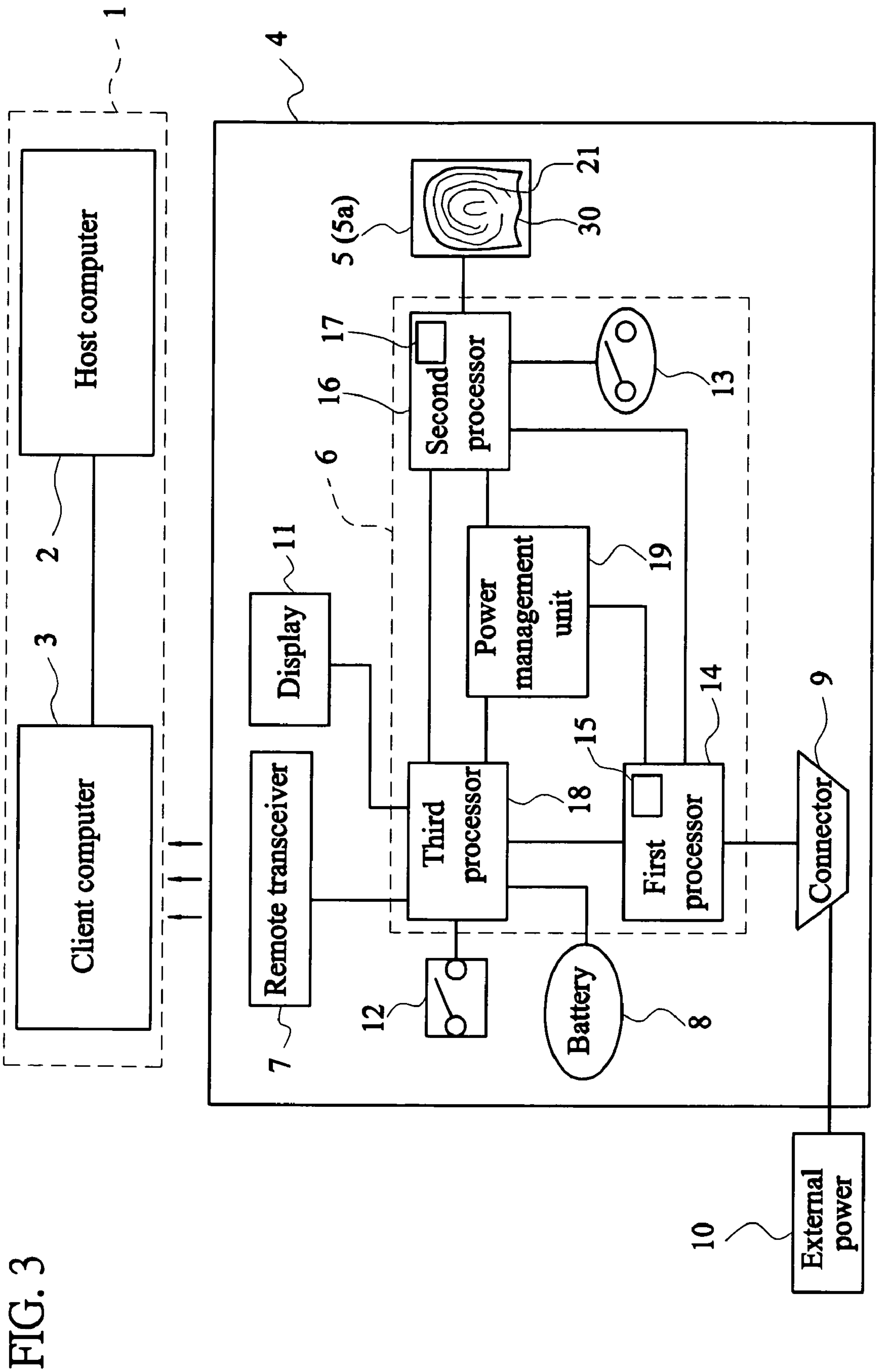
FIG. 3 is a block diagram showing a card-type biometric identification device and a host system according to the invention.

FIG. 3 is a block diagram showing a bio-card and a host system according to the invention. As shown in FIG. 3, the bio-card 4 of the invention is for identifying whether or not a to-be-identified holder beside the host system 1 is the authorized holder. The host system 1 has stored the personal data of the authorized holder and a pseudorandom-code generating program corresponding to the personal data. The bio-card 4 includes a biometric sensor 5, an operating/processing module 6, a remote transceiver 7 and a rechargeable battery 8. In order to achieve the detailed operation functions of the embodiment of the invention, the bio-card 4 may further includes a connector 9, a display 11, a power switch 12 and a biometric data reading switch 13. The host system 1 includes a host computer 2 and a client computer 3 in communication with the host computer 2 and the bio-card 4. The operating/processing module 6 basically includes a first processor 14, a second processor 16, a third processor 18 and a power management unit 19. The first processor 14 may usually include a first memory 15, and the second processor 16 may usually include a second memory 17 for storing data.

When the organization wants to issue the bio-card 4 to the authorized holder, the personal data and the specific personal pseudorandom-code generating program are simultaneously inputted to the host computer 2 of the issuer and the bio-card 4, wherein the pseudorandom-code generating program and the personal data are transferred to the operating/processing module 6 via the connector 9 connected thereto. The operating/processing module 6 can receive, process and store the pseudorandom-code generating program and the personal data only once so as to avoid the unauthorized copy or use. The first processor 14 receives, processes, and stores the pseudorandom-code generating program and the personal data in the first memory 15. In addition, the rechargeable battery 8 also may be charged via the connector 9 that receives external power from the external power source 10.

When the user first time receives this bio-card 4, he or she has to input the authorized biometric data. For example, the card holder has to input his or her biometric data such as the fingerprint, voice, or signature at the issuing place. After turning on the power switch 12, the bio-card 4 is placed on or above a magnetic field generator to turn on the biometric data reading switch (e.g., reed switch) 13 that is built in this device, and then the authorized biometric data is inputted via the biometric sensor 5. The second processor 16 of the operating/processing module 6 receives and processes the authorized biometric data by performing fingerprint image processing procedures and minutia point or block extracting and encrypting procedures with respect to the authorized biometric data, and then stores the encrypted data in the second memory 17. It is to be noted that the authorized biometric data can be stored to the operating/processing module 6 only once, and the process has to be finished within the limited time so as to enhance the security. Furthermore, multiple sets (e.g., eight sets) of authorized biometric data may be stored in the operating/processing module 6 in order to enhance the identification precision. In terms of the present technology, the second processor 16 must have the operation speed higher than 60 MHz if the biometric data identifying operation has to be finished within one second.

When a to-be-identified holder uses the bio-card 4 within an operative range of the client computer 3 (i.e., the operative range of the remote transceiver), he or she has to turn on the power switch 12 first such that the rechargeable battery 8 supplies power to other electrical components and the remote transceiver 7 transfers the personal data (e.g., name, birthday, persuasion, and the like) to the client computer 3 as the reference for identification check and the acquisition of the pseudorandom-code generating program corresponding to the personal data. If the client computer 3 has finished the checking operation, the client computer 3 also transfers a suitable message (communication signal) back to the remote transceiver 7 of the bio-card 4, and the message is then displayed on the display 11 to guide the to-be-identified holder to input the biometric data. On the contrary, if the data check is not passed, the device turns to be invalid. Next, the to-be-identified holder inputs his or her to-be-identified biometric data (e.g., fingerprint, voice, signature, or the like) to the second processor 16 of the operating/processing module 6 via the biometric sensor 5. The second processor 16 processes the to-be-identified biometric data, loads the authorized biometric data for decryption, and then compares the to-be-identified biometric data to the authorized biometric data. After the to-be-identified biometric data is judged to substantially match with the authorized biometric data, the second processor 16 enables the first processor 14 to output the successful check information of the biometric data to the client computer 3 via the third processor 18 and the remote transceiver 7. The host system 1 synchronously communicates with the bio-card 4 via the remote transceiver 7 and loads the pseudorandom-code generating program corresponding to the personal data, and then utilizes the pseudorandom-code generating program to generate an authorized code. Meanwhile, the first processor 14 generates and outputs a to-be-identified code to be checked with the authorized code according to the pseudorandom-code generating program, and the successful check information may be displayed on the display 11. The invention makes active communications and synchronization between the remote transceiver 7 and the host system and may thus avoid any human operation error. It is to be noted that the host system 1 also may start to load the pseudorandom-code generating program corresponding to the personal data for standby immediately after the personal data outputted from the bio-card 4 is received at the first time. Furthermore, the basic data checking operation also may be adjusted according to the actual conditions. In addition, the remote transceiver 7 of the invention also may be coupled to the host system 1 via indirect transferring. For instance, the connection may be made via the mobile phone or wireless network. Thus, the device of the invention is flexible and popular in usage.

The to-be-identified code also may be displayed on the display 11 coupled to the third processor 18 of the operating/processing module 6 via the third processor 18, and the operator may view and compare the to-be-identified code to the authorized code for the purpose of double identification of judging whether or not the to-be-identified holder is the authorized holder or for the purpose of key-in by the operator due to lack of remote transceiver at the client computer side. The to-be-identified biometric data may be inputted several times, and thus allows for the long-term and multiple times of usage of the bio-card 4.

The remote transceiver 7 of the bio-card 4 may utilize any protocol meeting any standard transmission/communication interface such as the infrared, bluetooth, and the like. The operating/processing module 6 may also include the power management unit 19 to manage the power of other electrical components in the bio-card 4 so as to allow for 70 to 100 times of usage after each recharge and avoid the inconvenience. It is to be noted that the operating/processing module 6 may be an ASIC (Application-Specific Integrated Circuit) in order to miniaturize the device.

In summary, the biometric sensor 5 of the bio-card 4 of the invention is for reading and outputting a set of authorized biometric data of the authorized holder and a set of to-be-identified biometric data of the to-be-identified holder. The operating/processing module 6 is for receiving, processing and storing the pseudorandom-code generating program, the personal data and the authorized biometric data only once, and may then receive and process the to-be-identified biometric data multiple times. Then, the operating/processing module 6 may generate and output a to-be-identified code by the pseudorandom-code generating program after the to-be-identified biometric data is judged to substantially match with the authorized biometric data. The remote transceiver 7 is for outputting the personal data, which is also stored in the biometric data. The remote device and is different from the to-be-identified code, to the host system 1 to enable the host system 1 to generate an authorized code according to the pseudorandom-code generating program corresponding to the personal data. Since the personal data has to be transferred to the client computer 3 as the reference for identification check and the aquisition of the pseudorandom-code generating program corresponding to the personal data, the personal data is outputted from the biometric identification device to the host system via the remote transceiver before the to-be-identified code is originally generated by the operating/processing module. The rechargeable battery 8 provides power for the operating/processing module 6, the biometric sensor 5 and the remote transceiver 7. Comparing the authorized code to the to-be-identified code, which is originally generated by the operating/processing module and is kept fixed, may judge whether or not the to-be-identified holder is the authorized holder.

In addition, the first processor 14 of the operating/processing module 6 is for receiving, processing and storing the pseudorandom-code generating program and the personal data only once. The second processor 16, which is coupled to the first processor 14 and the biometric sensor 5, is for receiving, processing and storing the authorized biometric data only once. Then, the second processor 16 may receive and process the to-be-identified biometric data multiple times, and enable the first processor 14 to output the to-be-identified code after the to-be-identified biometric data is judged to substantially match with the authorized biometric data. The third processor 18 coupled to the first processor 14 is for receiving, processing and outputting the personal data and a to-be-identified code. The power management unit 19 coupled to the first processor 14, the second processor 16 and the third processor 18 manages the power of the device.

The invention also provides a biometric identification method for identifying whether or not a to-be-identified holder holding a bio-card 4 beside a host system 1 is an authorized holder of the bio-card. The host system 1 and the bio-card have stored a set of personal data of the authorized holder and a pseudorandom-code generating program corresponding to the personal data, and the bio-card 4 has stored a set of authorized biometric data of the authorized holder.

When the method of the invention is executed, a set of to-be-identified biometric data of the to-be-identified holder is firstly read and outputted to the operating/processing module 6. Then, the operating/processing module 6 processes and judges whether or not the to-be-identified biometric data substantially matches with the authorized biometric data. If the to-be-identified biometric data substantially matches with the authorized biometric data, the operating/processing module 6 generates the to-be-identified code according to the pseudo-random-code generating program stored therein. Next, the operating/processing module 6 outputs the personal data to the host system 1 to enable the host system 1 to generate the authorized code according to the pseudorandom-code generating program corresponding to the personal data. Comparing the to-be-identified code to the authorized code can judge whether or not the to-be-identified holder is the authorized holder. The to-be-identified code may be displayed on the display 11 of the bio-card 4, or may be transferred to the host system 1.

In brief, the device only utilizes the connector for the one-time input of the pseudorandom-code generating program and the personal data as well as for the repeated charging operations, and the connector need not to be in contact with any terminal system because the personal data is outputted via the wireless transmission (wireless transmission also includes the encryption function). Thus, the most secure design is provided because the chance of unauthorized copy or usage is completely eliminated. In addition, the standard wireless transmission interface enhances the communication convenience and privacy between the device and the host system, and the human error may be avoided. The rechargeable design of this device enables the long-term usage of this device, and solves the problems of convenience and distribution. Moreover, this battery can be changed by a proper housing design to enhance the life time requirement. Because the pseudorandom-code generating program does not need the high-speed processor for operation, the device of the invention does not cause relatively great loading in the host system 1.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A card-type biometric identification device for identifying whether or not a to-be-identified holder beside a host system is an authorized holder, the host system stores personal data of the authorized holder and a pseudorandom-code generating program corresponding to the personal data, the card-type biometric identification device comprising:

a biometric sensor for reading and outputting authorized biometric data of the authorized holder and to-be-identified biometric data of the to-be-identified holder;

an operating/processing module that receives, processes and stores the pseudorandom-code generating program, the personal data and the authorized biometric data only once, and then receives and processes the to-be-identified biometric data multiple times, wherein the operating/processing module originally generates and outputs a to-be-identified code by the pseudorandom-code generating program after the to-be-identified biometric data is judged to substantially match with the authorized biometric data;

a remote transceiver for outputting the personal data, which is also stored in the biometric identification device and is different from the to-be-identified code, to the host system to enable the host system to generate an authorized code according to the pseudorandom-code generating program corresponding to the personal data, wherein the personal data is outputted from the biometric identification device to the host system via the remote transceiver before the to-be-identified code is originally generated by the operating/processing module, and it is judged whether or not the to-be-identified holder is the authorized holder by comparing the authorized code to the to-be-identified code originally generated by the operating/processing module; and a rechargeable battery for providing power for the operating/processing module, the biometric sensor and the remote transceiver.

2. The device according to claim 1, further comprising:

a connector coupled to the operating/processing module, wherein the personal data and the pseudorandom-code generating program are received through the connector.

3. The device according to claim 1, further comprising:

a connector coupled to the operating/processing module, wherein the personal data and the pseudorandom-code generating program are received through the connector, and the rechargeable battery is charged by an external power source through the connector.

4. The device according to claim 1, further comprising:

a display, which is coupled to the operating/processing module and for displaying the to-be-identified code.

5. The device according to claim 1, further comprising:

a power switch coupled to the operating/processing module, wherein the authorized holder and the to-be-identified holder control the rechargeable battery to provide the power.

6. The device according to claim 1, further comprising:

a biometric data reading switch that is turned on only once to enable the authorized holder to input the authorized biometric data.

7. The device according to claim 1, wherein the operating/processing module comprises:

a first processor having a first memory, wherein the first processor receives, processes and stores the pseudorandom-code generating program and the personal data only once;

a second processor having a second memory, wherein the second processor is coupled to the first processor and the biometric sensor to receive, process and store the authorized biometric data only once, and then receive and process the to-be-identified biometric data multiple times, and enables the first processor to output the to-be-identified code after the to-be-identified biometric data is judged to substantially match with the authorized biometric data;

a third processor, which is coupled to the first processor and for receiving, processing and outputting the personal data and the to-be-identified code; and a power management unit, which is coupled to the first processor, the second processor and the third processor and for managing the power.

8. The device according to claim 1, wherein the host system comprises:

a host computer, in which the pseudorandom-code generating program and the personal data are stored;

a client computer communicating with the host computer and serving as a communication interface with the card-type biometric identification device.

9. The device according to claim 1, further comprising a hologram security label.

10. The device according to claim 1, wherein the biometric sensor is a fingerprint sensor, a voice sensor or a digital panel.

11. The device according to claim 1, wherein the rechargeable, battery is a polymeric lithium battery.

12. The device according to claim 1, wherein the biometric sensor is a chip-type fingerprint sensor.

13. The device according to claim 12, wherein the chip-type fingerprint sensor is a two-dimensional fingerprint sensor or a sweep-type fingerprint sensor.

14. The device according to claim 1, wherein the pseudorandom-code generating program in the host system and the pseudorandom-code generating program in the operating/processing module synchronously generate the authorized code and the to-be-identified code.

15. The device according to claim 1, wherein the remote transceiver further receives a communication signal from the host system.

16. The device according to claim 1, wherein the to-be-identified code being generated is kept fixed.

17. A card-type biometric identification method for identifying whether or not a to-be-identified holder of a card-type biometric identification device beside a host system is an authorized holder of the card-type biometric identification device, personal data of the authorized holder and a pseudorandom-code generating program corresponding to the personal data being stored in both of the host system and the card-type biometric identification device, and the card-type biometric identification device storing authorized biometric data of the authorized holder, the method comprising the steps of:

reading and outputting to-be-identified biometric data of the to-be-identified holder to an operating/processing module;

processing, by the operating/processing module, the to-be-identified biometric data and judging, by the operating/processing module, whether or not the to-be-identified biometric data substantially matches with the authorized biometric data:

originally generating, by the operating/processing module, a to-be-identified code according to the pseudorandom-code generating program stored therein if the to-be-identified biometric data substantially matches with the authorized biometric data; and causing the operating/processing module to output the personal data to the host system to enable the host system to generate an authorized code according to the pseudorandom-code generating program corresponding to the personal data, wherein the personal data is outputted from the biometric identification device to the host system via the remote transceiver before the to-be-identified code is originally generated by the operating/processing module, and comparing the to-be-identified code, which is originally generated by the operating/processing module, to the authorized code may judge whether or not the to-be-identified holder is the authorized holder.

18. The method according to claim 17, wherein the operating/processing module directly outputs the personal data and the to-be-identified code to the host system via a remote transceiver in a wireless transmission manner.

19. The method according to claim 17, wherein the operating/processing module indirectly outputs the personal data and the to-be-identified code to the host system via a remote transceiver in a wireless transmission manner.

20. The method according to claim 19, wherein the personal data and the to-be-identified code are indirectly outputted to the host system via a mobile phone or wireless network.

21. The method according to claim 17, further comprising the step of:

displaying the to-be-identified code on a display of the card-type biometric identification device.

22. The method according to claim 17, further comprising the step of:

comparing, by the host system, to determine whether or not the personal data stored therein substantially matches with the personal data outputted from the operating/processing module.

23. The method according to claim 17, wherein the to-be-identified code being generated is kept fixed.

* * * * *